United States Patent [19]
Bedenk et al.

[11] 3,753,728
[45] Aug. 21, 1973

[54] PROCESS FOR PRODUCTION OF SOY-CONTAINING BREAKFAST CEREALS

[75] Inventors: William T. Bedenk, Springfield Twp., Hamilton County; David E. O'Connor, Cincinnati, both of Ohio

[73] Assignee: The Proctor & Gamble Company, Cincinnati, Ohio

[22] Filed: Oct. 5, 1970

[21] Appl. No.: 78,274

[52] U.S. Cl. ............................ 99/81, 99/83, 99/17
[51] Int. Cl. ................................................ A23l 1/18
[58] Field of Search ................. 99/14, 17, 81, 82, 99/83, 98, 99

[56] References Cited
UNITED STATES PATENTS

| | | | |
|---|---|---|---|
| 2,436,519 | 2/1948 | Lulce | 99/83 |
| 2,478,438 | 8/1949 | Thompson | 99/82 |
| 2,853,388 | 9/1958 | Kieley et al. | 99/83 |
| 3,585,047 | 6/1971 | Sujinalce | 99/98 |
| 2,881,076 | 4/1959 | Fair | 99/14 |

*Primary Examiner*—Raymond N. Jones
*Attorney*—Richard C. Witte

[57] ABSTRACT

Process for making ready-to-eat breakfast cereal containing soy protein. Soy protein is made more palatable by subjecting it to a partial hydrolysis reaction in the presence of a specific mixture of proteolytic enzymes. A mixture of proteolytic enzyme papain and at least one other proteolytic enzyme has the effect of more efficiently causing the partial hydrolysis of soy protein than does a single enzyme at the same addition level.

16 Claims, No Drawings

PROCESS FOR PRODUCTION OF SOY-CONTAINING BREAKFAST CEREALS

BACKGROUND OF THE INVENTION

This invention relates to breakfast cereals of the ready-to-eat or cold cereal class, the two terms used herein interchangeably. By the process herein described cereal products are produced that are highly nutritional and have excellent eating qualities.

Cereal manufacturers have long tried to incorporate a significant amount of soy protein into a cold cereal product but until recently have been unsuccessful. A cold cereal product containing soy protein is desirable because of the enhancement of the nutritional value of the cereal resulting from the soy protein. However, the soybean has certain deficiencies that have delayed their use in cereal products intended for human use. For instance, the soybean possesses a rather unacceptable taste so that at only relatively low levels of soybean content is the characteristic soy taste undetectable. Various debittering techniques have been developed to remove the organoleptically objectionable components of the soybean and have met with some success. Sugar coatings and various flavor additives also have been used to mask the bitter soy flavor.

Other drawbacks experienced with the soybean as a cold cereal component have been its adverse effect on the cereal's eating quality and also the effect it has on the processability of the ingredients into a form suitable for human consumption. Eating quality refers to a cold cereal's crispness retention and tenderness. Crispness retention is the characteristic of a cold cereal product after having been wetted by an aqueous liquid, e.g., milk that involves the retention of a solid crunchy structure that is detected during eating. Crispness of a cereal steadily decreases after being wetted until eventually a soggy product is the result. Tenderness, on the other hand, refers to the ease with which the cereal particle breaks down in the mouth. A cereal product can be deficient in this respect by being either too hard or too tough. As a general rule a cereal product becomes more tender when soaked in an aqueous liquid with the passing of time. Soy containing cereal products are undesirable because the soy diminishes the cold cereal product's crispness retention and also because the soy imparts a toughness or leatheryness to the cereal when soaked in liquid.

Still another drawback experienced with the use of soy in a breakfast cereal encountered in "puffed" products is the adverse effect soy exerts on the puffability of a cereal particle. Ready-to-eat breakfast cereals are produced in many forms and shapes such as flakes, puffed cereal pieces, biscuits, granules, shreds and the like. A part of the process of producing the flake and puffed form involves what is referred to as a puffing operation. During puffing, relatively dense flakes and particles are converted into lighter, more porous flakes and particles by causing trapped moisture to expand very rapidly from the liquid state to the vapor phase. Soy, however, hinders this change in structure and thereby indirectly affects also the eating quality of the cereal since well-puffed cereals are more crisp and tender than poorly puffed cereals.

Commonly assigned, copending applications Ser. No. 50,980, *Production of Ready-to-Eat Breakfast Cereals Containing Soy Flour* by Alexander L Liepa, Ser. No. 50,925, *High Protein Ready-to-eat Breakfast Cereals Containing Soy Concentrate* by William T. Bedenk, and Ser. No. 50,924, *High Protein Ready-to-Eat Breakfast Cereals Containing Soy Isolate* by William T. Bedenk, all contain disclosures as to the treatment of their respective soy protein sources to make them more compatible. The treatment comprises mixing 50 to 80 percent water by weight of the total mixture with the protein source and adding 25 ppm – 2500 ppm of a proteolytic enzyme or enzymes based on the soy protein source. This mixture is held at 80°F to 160°F for 1 minute to 120 minutes to cause a partial hydrolysis of the soy protein source. Such a treatment unexpectedly improves the flavor, crispness retention, tenderness, and puffability of a cereal product containing the soy protein to such an extent that the soy protein can form a major portion of the end product.

In accord with this invention a cold cereal product is produced containing a soy protein source which has been partially hydrolyzed in a more efficient manner than known heretofore. The total proteolytic enzyme level needed to obtain a partial hydrolysis to the degree desired is reduced to a level which prior to this invention was ineffective.

It is the general object of this invention to produce a high protein content ready-to-eat cereal.

It is a further object of this invention to produce a soy protein-containing high protein content ready-to-eat breakfast cereal by a process whereby the soy protein is partially hydrolyzed to the degree desired in a very efficient manner.

It is a further object of this invention to produce a soy protein-containing high protein content ready-to-eat breakfast cereal by a process whereby the soy protein is partially hydrolyzed in the presence of a specific mixture of proteolytic enzymes, which specific mixture causes a more efficient partial hydrolysis than does a single enzyme at the same addition level.

More specifically, it is an object of the present invention to produce a high protein content ready-to-eat cereal by a process wherein the protein source is partially hydrolyzed in the presence of papain and at least one other proteolytic enzyme.

This and other objects will become apparent from the following description of the invention.

SUMMARY OF THE INVENTION

Briefly stated, this invention concerns the production of highly palatable and nutritive beakfast cereal products. More specifically, the cold cereal products of this invention comprise a soy protein source and a cooked cereal grain in proportions such that the total protein content of the breakfast cereal is at least 20 percent. Such a product is produced by mixing water with a soy protein source, papain and at least one other proteolytic enzyme. The above mixture is then exposed to an elevated temperature for a length of time sufficient to cause a partial hydrolysis of the soy protein source and then further processed into the desired end product.

DESCRIPTION OF THE INVENTION

In the present invention there is produced a protein enriched cold cereal product that is produced in any shape or form desired such as shredded, puffed, crumbled, biscuit, granule, flaked and the like. Soy protein is used as the major source of protein. As used herein, soy protein is generic to soy flour, soy protein concentrate, and soy protein isolate and will be used in the description to follow. All three protein sources are commercially available and the use of them in the present invention can be done interchangeably. Any deviations in the processing of the three protein sources will be noted in the description to follow. The soy protein sources useful in this invention are defatted and refined soybeans. Soy flour contains 40 up to 70 percent protein, soy protein concentrate contains 70 up to 90 percent protein and soy protein isolate contains 90 up to 100 percent protein.

In accord with this invention soy protein is made more palatable by subjecting it to a partial hydrolysis. The partial hydrolysis is accomplished by including in the reaction mixture the proteolytic enzyme papain plus at least one other proteolytic enzyme. The mixture of the above enzymes is able to promote a partial hydrolysis while an equal amount of a single enzyme does not cause a partial hydrolysis to the same degree. The degree of partial hydrolysis of the soy protein is important because it has a direct effect on the soy-containing end product's taste. That is, a different degree of partial hydrolysis in two protein sources will result in different eating qualities of two cereal products containing the respective soy protein source. The greater the degree of partial hydrolysis of the soy protein source the more tender will be a cold cereal product containing that partially hydrolyzed soy protein and, hence, more desirable up to a point, i.e., a too tender product is also undesirable to the average consumer. As taught herein, the exact degree of partial hydrolysis desired is obtained in a very efficient manner when the soy protein and water are reacted in the presence of papain and at least one other proteolytic enzyme at the conditions set out hereinafter. The reaction is efficient in the sense a lower total proteolytic enzyme level promotes the partial hydrolysis to the exact degree desired when the specific enzume mixture papain and at lease one other proteolytic enzyme is included in the reaction mixture as opposed to other enzyme mixtures or single enzymes at the same reaction conditions.

After the proper degree of partial hydrolysis of the soy protein source has occurred, it is further processed into the final product. A preferred method comprises extruding the partially hydrolyzed soy protein source into strands of a relatively small cross-sectional area, pelletizing the strands, flaking and puffing or immediately puffing after pelletizing. Additional steps such as toasting or coating can be added to further enhance the product's taste and/or appearance.

In a preferred embodiment of this invention a gelatinized cereal grain is added to a partially hydrolyzed soy protein in proportions such that the total protein content of the end product is at least 20 percent. This mixture is further processed into a final form suitable for human consumption in the manner above described for the soy source alone.

By the process of the present invention the soy protein is made more palatable by forming a mixture of the soy protein source, water, the proteolytic enzyme papain, and at least one other proteolytic enzyme. Quite unexpectedly, the above specific mixture of proteolytic enymes promotes a partial hydrolysis to the degree desired while an equal level of either papain alone, another proteolytic enzyme or a mixture of other proteolytic enzymes under the same reaction conditions does not result in the same degree of partial hydrolysis. Only at levels of proteolytic enzymes substantially greater than the total level of papain and at least one other proteolytic enzyme is there obtained the same degree of partial hydrolysis under the same conditions. In that proteolytic enzymes are relatively expensive it it imperative that as low a level of proteolytic enzyme as possible commensurate with the proper degree of partial hydrolysis be used.

No hydrolysis of the soy protein or only a partial hydrolysis less than that achieved by following the reaction conditions of this invention gives an unacceptable tasting product as well as a poorly processable ingredient. A degree of hydrolysis of the soy protein in excess of that experienced under the conditions set out hereinafter results in a product having an unacceptable taste. Only when the soy protein is partially hydrolyzed to the degree taught herein and further processed to an end product is there obtained an acceptable soy-containing high protein ready-to-eat breakfast cereal.

The proteolytic enzymes useful in the present invention in conjunction with papain are selected from any of several known proteolytic enzymes or mixtures thereof extracted from animal, plant, fungal, or microbial sources. A primary consideration in the enzyme or enzyme mixture used is that it must not contribute a significantly objectionable flavor or odor to the final product. Some examples of proteolytic enzymes found effective in the soy protein partial hydrolysis step that can be used with the papain are pepsin, bromelin, ficin, alcalase, maxitase, thermoase, pronase, and mixtures thereof.

In this invention, 15 ppm - 2500 ppm of papain and 5 ppm–2,500 ppm of at least one other proteolytic enzyme by weight of the soy protein is sufficient to cause the desired degree of partial hydrolysis when the reaction mixture is exposed to a temperature of 80°F to 160°F for 1 minute to 120 minutes. The preferred levels of enzymes are 100 ppm – 300 ppm of the papain and 100 ppm – 300 ppm of at least one other proteolytic enzyme based on the weight of the protein. Temperatures of 120°F to 130°F and times of 1 minute to 5 minutes are preferred.

The amount of water needed for the partial hydrolysis reaction is basically determined by apparatus limitations. That is, the lower limit of water is determined by the capability of the mixing equipment. The lower the level of water the more viscous will be the resultant mixture. On the other hand, an excessive amount of water in the partial hydrolysis reaction would necessitate additional work in reducing the water level in subsequent processing steps. The preferred level of water is 50 to 80 percent based on the total weight of the mixture. The most preferred level is 55 to 60 percent based on the total weight of the mixture.

Under the above conditions the soy protein source is partially hydrolyzed to the extent that a cold cereal product containing the soy protein is acceptable with regard to taste, tenderness, crispness retention, and processability.

An equal level of a single enzyme, e.g., papain or any other enzyme, and the same reaction conditions produces an end product which is not as acceptable with regard to eating quality and processability as the product produced in accord with this invention, thereby indicating that the soy protein source has not been partially hydrolyzed to the degree needed. That such an effect would be obtained with the specific mixture of proteolytic enzymes, papain and another enzyme as opposed to single enzymes or any other mixture was quite unexpected.

The production of a cold breakfast cereal containing the partially hydrolyzed soy protein is done by various general procedures used for making cold cereal products and depends in large part on the desired form, type, or condition of the final product. Typically the partially hydrolyzed soy protein is extruded into strands of a relatively small cross-sectional area and thereafter sliced into small lengths thereby forming small pellet-like particles. These pellet-like particles are partially dried, if necessary, and formed into flakes. The flakes are then subjected to a puffing operation to transform them into less dense, more porous, and tender flakes. Toasting and/or a coating operation may be employed to enhance the color and/or flavor of the resultant protein fortified cereal product. Alternatively, instead of producing a flake-like product, the flaking step can be omitted with a puffed pellet-shaped product being the result.

In the preferred method of transforming the partially hydrolyzed soy protein-water dough into the finished product, the first step is to extrude the dough into strands. An extruder has the effect of mixing the ingredients even more intimately and of forming the dough into a shape easier to handle and more adaptable for existing equipment. Relatively low pressures in the extruder are sufficient for this operation. Pressures within the range of 500 p.s.i.g. to 1,000 p.s.i.g. are preferred. Lower pressures can be used but should preferably be avoided since less of a mixing action in the extruder results from the low compressive forces associated with low pressures. Pressures higher than 1,000 p.s.i.g. exert little extra benefits and for this reason are avoided. Temperatures employed in the extrusion process are not a critical feature but do have some effect on the handling characteristics of the extrudant, such as stickiness and body. Temperatures falling within the range of 140°F to 200°F have been found to be satisfactory.

The shape of the strands that issue from the extruder is determined by the particular extruder die used in the outlet of the extruder and these strands, in turn, greatly influence the shape of the individual particles of the final product. For instance, if the shape of the strand is circular in its cross-sectional area the ready-to-eat cereal made from this strand will have a different shape or configuration than will a cereal product made from strands that are square, triangular, or any other shape in its cross-sectional area. The particular die used in the extruder is a matter of choice dictated primarily by the shape desired for the final product.

The strands that are extruded from the extruder are next sliced to form pellet-like particles. The choice of the cross-sectional size of the strand issuing from the die and length of cut depends on the size requirement of the final individual pieces of cereal. Such parameters are easily determined.

After pelletizing, the pellet-like particles are tempered, if necessary, and run through flaking rolls. Depending on the formulation and process conditions used throughout the process, it may be necessary to allow the strands and freshly cut pellets to cool down and/or dry somewhat. This tempering has the effect of reducing the tackiness oftentimes associated with partially processed cereal dough. A hold time of up to 30 minutes is sufficient to temper the strands while a hold time of up to 2 minutes is sufficient for the freshly cut pellets. With some formulations there may be no sticking problem in which case the strands and/or pellets can pass directly to the next operation without any tempering step.

If a flake-type cereal product is desired, the next step after pelletizing is mechanically modifying the pellets to a flake form. This can be accomplished by passing the pellets between a pair of cooperating rollers or a roller and a flat surface spaced apart a distance sufficient to produce the desired flake thickness. In accord with this invention it has been found that a flake thickness of 7 to 12 mils is sufficient to produce a satisfactory product. As the flakes leave the rolls they are in a dense and relatively hard condition. Such a flake is unacceptable to the average consumer and, accordingly, an additional processing step must be performed to produce a lighter and more porous flake structure.

Breakfast cereals obtain the desired flake structure by a process known as puffing. Puffing of the flake is also quite important in that it enhances the flake's crispness and tenderness. Cereal flakes containing untreated soy protein are difficult to puff but, unexpectedly, soy protein when partially hydrolyzed in the manner heretofore described does not act as a hindrance on puffing but rather actually improves puffability. This factor is of importance in that the more porous type flakes have a tendency to be more tender than the less porous or less puffed flake. Additionally, soy flavor is diminished even more in the better puffed of two soy-containing flakes. Basically a cereal is puffed by causing trapped moisture in the flake to expand very rapidly from the liquid state to the vapor phase. Rapid heating or a rapid decrease in the pressure are the methods commonly used to convert dense hard flakes into the more palatable porous tender flake. Both methods are well known and are commonly used throughout the industry. Gun puffing is an example of the principle of a rapid decrease in pressure. In this process the cereal flakes are first heated under high pressure and then the pressure is rapidly released to achieve the puffing effect. The process disclosed in U.S. Pat. No. 3,253,533 is an example of a rapid heating puffing method. Commonly assigned copending application Ser. No. 76771, *Apparatus and Process of Puffing*, by William T. Bedenk and Lawrence Grabel, also discloses a rapid heating puffing method.

To achieve the optimum puffing, care must be taken in controlling the initial moisture content of the unpuffed flake. The specific moisture content that is best depends on the particular puffing process utilized and the particular grain in admixture with the soy isolate. For instance, for a blend of soy isolate and cooked gelatinized corn a moisture content of 12 to 14 percent is optimum for gun puffing while 10–12 percent moisture content is best for puffing by a proces that rapidly heats the flake. The optimum moisture content for any one particular flake composition and puffing technique is best determined on an individual basis.

Additional processing steps are utilized if it is so desired. For instance a toasting operation is used after the puffing step if it is desired to change the color of the flake to a more desired rich golden brown. Frequently, a slight toasting step also brings out a pleasant toasted flavor note.

The flakes can also include various materials to improve taste, appearance and/or functional properties. For instance sugar, salt, flavoring, coloring and/or spices can be used in the formulation either in the original dough or as a coating on the puffed flake. Vitamins and minerals can also be included in the formulation to increase the nutritional value of the breakfast food.

The above preferred process has been described in regard to producing a product having a flake-type structure. However, if a puffed sphere-type product is desired the above described preferred process only has to be modified slightly. After the formation of pellet-type particles and the tempering period, if any is required, the cereal particles are sent directly to the puffing operation, by-passing the flaking roll or rolls. Thus, the only modification in the process described for producing a flake product is the omission of passing the pellet-like particles through the flaking step.

In accordance with another and preferred aspect of the present invention, a cereal grain selected from the group consisting of corn, wheat, rice, barley, oats, and mixtures thereof, is admixed with the partially hydrolyzed soy protein and thereafter processed to form a composite final product that still has a high protein content, i.e., greater than 20 percent. As with the cereal product made from soy prtein alone forming the structure of the product, the cereal product comprising treated soy protein and a cereal grain is produced by general processes of cereal manufacture depending on the desired form, type, or condition of the final product.

In the preferred process the additive cereal grain is separately cooked or gelatinized and then mixed with the partially hydrolyzed soy protein to form a dough. This dough is then processed in accord with the preferred process above described with respect to the all soy protein cereal product. That is, the dough is extruded, pelletized, dried if necessary, and puffed. Alternatively, the pellets are flaked prior to the puffing operation to form a flaked product. Toasting and/or a coating operation may be added to the process.

The cooking or gelatinizing of the cereal additive is performed under conditions similar to those commonly used in the industry. Thus, either a batch cooking or continuous cooking operation is used. Different methods of cooking include heating at atmospheric pressure in an agitated kettle, heating at elevated pressure in a tumbling type mixer and heating under high pressure in a continuous mixer-extruder.

The amount of water and temperature needed to gelatinize the grains depends upon the particular grain and the particular method used. The preferred method of gelatinizing the cereal grain is by cooking in an extruder under pressure. Such a process is continuous and can be accomplished with greater ease. Additionally, the use of higer pressures attainable in the extruder allow the use of higher temperatures and also lower water levels than possible with a batch type cooking operation. The use of lower water levels thus minimizes the amount of drying required in subsequent steps. Using an extrusion type process at 100 psig to 200 psig pressure and temperatures in the range of 250°F to 350°F, 12 to 25 percent water based on the total mixture is sufficient to gelatinize the cereal grain.

The gelatinized cereal grain can, at this point, be added to the previously partially hydrolyzed soy protein and further processed to produce the cold cereal product. Preferably, though, the water content of the gelatinized cereal grain is reduced prior to mixing with the partially hydrolyzed protein source. This additional operation is preferred at this point in the process so that subsequent handling and processing operations proceed more smoothly. Excessive moisture levels in the mixture cause subsequently formed individual cereal forms or shapes to lack body or be overly soft and difficult to handle. The amount of moisture present in the cooked cereal grain at the time of addition to the treated soy protein mixture must be relatively low because water still present from the partial hydrolysis of soy protein will contribute significantly to the total moisture content of the mixture. It is preferred that 15 to 30 percent water be present in the soy protein-cooked grain mixture when the product is being made by the preferred method. Accordingly, to reach the lower water levels often desired, less than 5 percent water must be present in the cooked cereal grain prior to mixing with the soy flour. If the cereal is gelatinized by the continous extrusion method under pressure, as in the preferred cooking method, the resultant extrudant may flash dry and thereafter contain less than 5 percent water and as such would not need the additional drying operation.

Depending on the cooking process used, it may be necessary to first break any lumps of cooked cereal formed during the cooking process so that proper drying, if needed, can be performed. Some cereals, in particular corn, have a tendency to agglomerate during the cooking stage and as a result the lumps are more difficult to dry thoroughly. Any conventional lump-breaker is satisfactory for aiding in making the cooked cereal more susceptible to a thorough drying. If, of course, no lumps or agglomerates were formed or drying is not needed, this operation is eliminated. Various types of equipment are available for the lump-breaking operation and are used with equivalent results.

The cooked cereal grain can now be combined with the partially hydrolyzed soy protein or, optionally, given one more treatment to improve its processability. That is, the cooked cereal grain can be vigorously milled to increase its free starch content. In this regard reference is made to commonly assigned copending application Ser. No. 76990, *Production of Puffed Ready-to-Eat Cereal Products*, by William T. Bedenk and John W. Mitchell.

The cooked cereal grain is now combined with the partially hydrolyzed soy protein to form a dough and thereafter processed in the manner heretofore described with respect to the treated soy protein alone. Corn, rice, oats, and wheat all contain relatively low protein contents that must be accounted for when determining the total protein content of a soy flour-cereal grain cereal product. The approximate protein contents of corn, rice, oats, and wheat are 9 percent, 7 percent, 14 percent, and 12 percent, respectively. The exact protein content of a cereal grain and of the soy protein are determined by methods well known to those skilled in the art. The partially hydrolyzed soy protein and gelatinized cereal grain are combined together in proportions such that the end product has a protein content of at least 20 percent.

It should be understood that the soy protein partially hydrolyzed as taught herein can be further processed into a ready-to-eat breakfast cereal by processes in addition to the previously described extruding, pelletizing, flaking, and/or puffing process. For instance, one especially preferred method is the "extrusion puffing" method. In this method the partially hydrolyzed soy protein is mixed with other ingredients that go to making up the desired cold cereal composition, e.g., sugar, salt, gelatinized cereal grain, and thereafter fed into an extruder-puffer. Under operating conditions of 500 psig-1,000 psig at the puffing end, temperatures of 280° to 320°F and a speed of rotation of the extruder screw of 120–300 rpm, a very satisfactory puffed cold cereal product is obtained.

The following examples are given for the purpose of illustrating the production of the novel cold cereal products. Unless otherwise indicated, all percentages given are on a weight basis.

EXAMPLE 1

Formulation:
| | |
|---|---|
| Soy isolate | 662 grams |
| Water | 830 grams |
| Papain | 0.16 grams (242 ppm) |
| Alcalase | 0.08 grams (121 ppm) |

The above ingredients are mixed and held at 100°F for 1 hour. To 1,350 grams of this mixture is added 1,250 grams of gelatinized corn grits. The resultant blend is then passed through an extruder at a temperature of 200°F. The extrudant is in the form of strands having a diameter of about 3/16 inch. These strands are sliced to form pellet shapes 3/16 inch in length. The pellets are passed through a 2-roll mill to form flakes of about 11 mil thickness. These flakes are now puffed in a salt puffer wherein the salt is maintained at about 330°F. After toasting the puffed flakes at 400°F for 0.8 minutes the resultant cold cereal product is tested by an expert food panel.

The cold cereal product is tested for tenderness as measured on a 0–10 scale with a 10 rating being the most tender rating. The product is tested at 0 minutes and at intervals of 2, 4, 6, and 8 minutes after being wetted with milk. The results are as follows:

| Time | 0 | 2 | 4 | 6 | 8 |
|---|---|---|---|---|---|
| Tenderness | 6.25 | 6.5 | 8.0 | 9.0 | 10.0 |

COMPARATIVE TEST A

A cold cereal product is made by the same formulation and process steps and conditions of Example 1 with the exception that 0.24 papain (363 ppm) is substituted for the papain-alcalase mixture above. The same panel tested the resultant product in the same manner as Example 1 and rated it as follows:

| Time | 0 | 2 | 4 | 6 | 8 |
|---|---|---|---|---|---|
| Tenderness | 5 | 6 | 6.75 | 8.25 | 9 |

A comparison of the two tests shows that at all time intervals the first product, i.e., the formulation of Example 1 containing papain-alcalse, is more tender than the product of this comparative test containing papain at the same total proteolytic enzyme level.

COMPARATIVE TEST B

A cold cereal product is made by the same formulation and process steps and conditions of Example 1 with the exception that 0.32 grams papain (484 ppm) is substituted for the papain-alcalase mixture. The same panel rated the resultant product on the basis of the above described test as follows:

| Time | 0 | 2 | 4 | 6 | 8 |
|---|---|---|---|---|---|
| Tenderness | 5.75 | 6.25 | 6.75 | 8.5 | 9 |

A comparison of the ratings of the product of Comparative Test B and the product of Comparative Test A shows that even though a greater level of papain (33 percent greater) is used, the resultant product is very similar in regard to tenderness.

A comparison of the ratings of the product of Comparative Test B with the ratings of the product of Example 1 shows that even an increased level of a single proteolytic enzyme (484 ppm for this comparative test vs. a total enzyme level of 363 ppm for Example 1) does not give as tender a product as does a papain and other proteolytic enzyme mixture. Since enzyme level affects the degree of partial hydrolysis, it can be seen that a substantially greater level of a single proteolytic enzyme would be needed to give the same degree of partial hydrolysis and hence same tenderness rating as obtained by the specific mixtures of this invention.

What is claimed is:

1. In a process for the production of a ready-to-eat breakfast cereal containing soy protein and having a protein content of at least 20 percent, said process including the steps of preparing a soy protein containing cereal dough, shaping said dough, and puffing said dough, the improvement which comprises: reacting the soy protein with water for about 1 minute to about 120 minutes at about 80°F to about 160°F in the presence of from about 15 ppm to about 2,500 ppm of papain and from about 5 ppm to about 2,500 ppm of at least one other proteolytic enzyme, thereby causing partial hydrolysis of the soy protein to a degree that results in a product which is easily processed and which has an acceptable taste.

2. The process of claim 1 wherein the proteolytic enzyme is selected from the group consisting of pepsin, bromelin, ficin, alcalase, maxitase, thermoase, pronase, and mixtures thereof.

3. The process of claim 1 wherein the soy protein is selected from the group consisting of soy flour, soy protein concentrate, and soy protein isolate.

4. A process for making a palatable ready-to-eat breakfast cereal having a protein content of at least 20 percent comprising:
  a. reacting soy protein with water in the presence of from about 15 ppm to about 2,500 ppm of papain and from about 5 ppm to about 2,500 ppm of at least one other proteolytic enzyme for 1 minute to 120 minutes at 80°F to 160°F, thereby causing a partial hydrolysis of the soy protein;
  b. extruding the partially hydrolyzed soy protein into strands of a desired shape;
  c. slicing the strands into pellet-like particles; and
  d. puffing the pellet-like particles to form the ready-to-eat breakfast cereal.

5. The process of claim 4 further comprising blending a gelatinized cereal grain with the partially hydrolyzed soy protein prior to the extruding step.

6. The process of claim 5 wherein the proteolytic enzyme is selected from the group consisting of pepsin, bromelin, ficin, alcalase, maxitase, thermoase, pronase, and mixtures thereof.

7. The process of claim 6 wherein the gelatinized cereal grain is corn.

8. The process of claim 7 further comprising flaking the pellet-like particles prior to puffing.

9. The process of claim 4 wherein the papain and at least one other proteolytic enzyme are each present in an amount ranging from 100 ppm to 300 ppm by weight of the soy protein.

10. The process of claim 9 wherein the soy protein is reacted with the water at 120°F to 130°F for 1 minute to 5 minutes.

11. A process for making a palatable ready-to-eat breakfast cereal having a protein content of at least 20 percent comprising:
   a. reacting soy protein with water in the presence of from about 15 ppm to about 2500 ppm of papain and from about 5 ppm to about 2500 ppm of another proteolytic enzyme for 1 minute to 120 minutes at 80°F to 160°F, thereby causing a partial hydrolysis of the soy protein; and
   b. extruding-puffing the partially hydrolyzed soy protein to form the ready-to-eat breakfast cereal.

12. The process of claim 11 wherein 15 ppm-2500 ppm of the papain and 5 ppm-2500 ppm of at least one other proteolytic enzyme by weight of the soy protein are present in the reaction.

13. The process of claim 11 wherein the partially hydrolyzed soy protein is extruded-puffed under a pressure of 500 psig – 1000 psig and a temperature of 280°F – 320°F.

14. The process of claim 13 further comprising blending a gelatinized cereal grain with the partially hydrolyzed soy protein prior to the extruding-puffing step.

15. The process of claim 14 wherein the proteolytic enzyme is selected from the group consisting of pepsin, bromelin, ficin, alcalase, maxitase, thermoase, pronase, and mixtures thereof.

16. The process of claim 15 wherein the gelatinized cereal grain is corn.

* * * * *